UNITED STATES PATENT OFFICE.

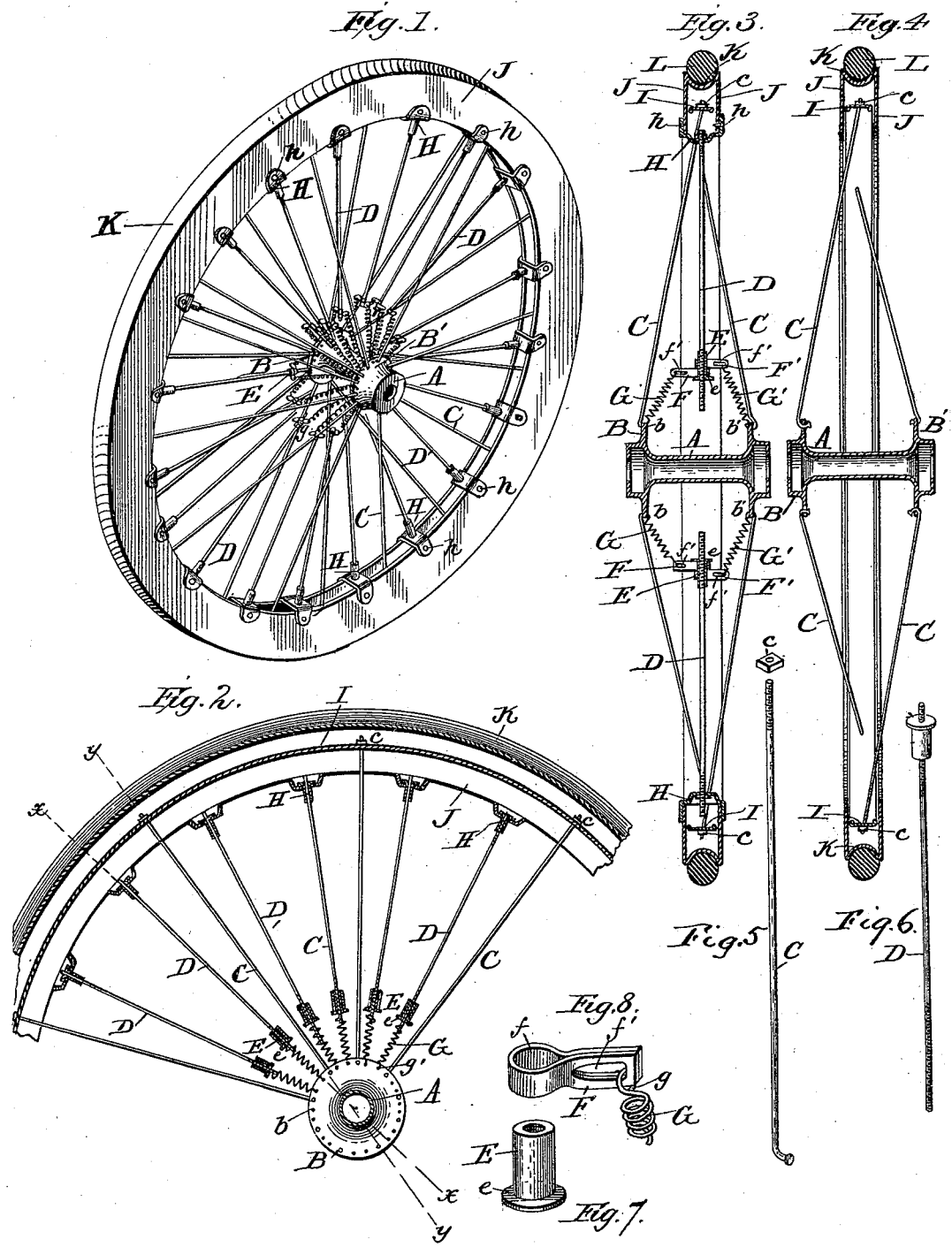

BENJAMIN J. BRAGDON, OF BELOIT, KANSAS.

BICYCLE-WHEEL.

SPECIFICATION forming part of Letters Patent No. 518,090, dated April 10, 1894.

Application filed November 3, 1893. Serial No. 489,897. (No model.)

*To all whom it may concern:*

Be it known that I, BENJAMIN J. BRAGDON, a citizen of the United States, and a resident of Beloit, in the county of Mitchell and State of Kansas, have invented certain new and useful Improvements in Bicycle-Wheels; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of a bicycle wheel of my improved construction. Fig. 2 is a sectional view of the same through the middle of the wheel, in a plane at right angles to the axle. Fig. 3 is a transverse sectional view on the vertical plane indicated by the broken line marked $x—x$ in Fig. 2. Fig. 4 is a similar view on the plane indicated by the broken line marked $y—y$. Fig. 5 is a detail view of one of the spokes of one set or series of spokes. Fig. 6 is a detail view of one of the spokes which alternate with the form of spoke shown in Fig. 5. Fig. 7 is a detail view of the tubular bushing at the lower ends of the adjustable spring-spokes; and Fig. 8 is a detail view of one of the arms which are held in place adjustably upon the spoke by said bushing.

Like letters of reference designate corresponding parts in all the figures.

This invention relates to the construction of the wheels of bicycles, racing-sulkies, and other vehicles intended for great speed and easy-running, and has for its object to take the place of so-called "pneumatic" or air-inflated tires. While this type of tubular rubber tires undoubtedly possesses many advantages as compared with solid tires, they also possess several disadvantages and drawbacks, among the most serious of which may, perhaps, be mentioned their liability to rupture, leakage and consequent collapse. Besides this, "pneumatic" tires, if properly constructed of a high grade of rubber, are necessarily expensive and require great care and frequent looking after, repair and renewal.

While my improved wheel possesses all the advantages of a first-class "pneumatic" tire, in respect of resiliency and easy running, it is absolutely free from the drawbacks mentioned, and can be manufactured at small expense.

My invention, therefore, consists in the novel and improved construction and combination of parts of the elastic-tire wheel which will be hereinafter more fully described and claimed.

On the accompanying drawings the reference-letter A denotes the tubular hub of my improved wheel, and B, B' the circular end-plates or hub-plates of the same. In these plates are fastened the inner ends of two sets of spokes, alternately with one another, viz: the plain and rigid wire-spokes C, and the adjustable spring-spokes D. The former are "dished" or set inwardly slanting alternately from the opposite hub-plates B and B', and have their screw-threaded outer ends securely nutted, by small nuts $c$, to the middle of the inner rim I, each one of the second set of spokes, D, is screw-threaded at its inner end, where it has screwed upon it a tubular sleeve or bushing E, having a projecting annular bearing-flange $e$ at its inner end, against which bear two short arms F and F', projecting to opposite sides, parallel to the hub and in alignment therewith and with each other. These arms, as will be seen more clearly by reference to the detail view Fig. 8, consist each of a flat steel strap or plate F, which is bent or doubled upon itself so as to form an eye or loop $f$ at one end, for the insertion of the flanged spoke-bushing E, and has its doubled free ends slotted, as shown at $f'$, to form eyes for the attachment of the upper hooked ends $g$ of the coiled spoke-springs G, G', the lower ends $g'$ of which are hooked into apertures $b$, $b'$ in the hub-plates B and B' respectively. Each spoke D has, as above stated, two arms, F and F', at its inner screw-threaded end, which may be adjusted, up or down, by means of the interiorly threaded bearing or bushing E $e$; each pair of arms F and F' forming the means of attachment for the outer ends of the coiled springs, G and G', the opposite or inner ends of which are, as we have seen, secured to the rims or peripheries of the parallel circular hub-plates B and B'.

Upon the outer end of each of the spring-spokes D is fastened a clip H, to the sides of which are firmly secured, by means of rivets $h$, the parallel sides J J of the outside rim; said sides being connected longitudinally by the concave tire-seat K, in which is placed a solid tire L, of rubber or other suitable elastic material. The sides of the inner rim I are not fastened or connected in any manner to the adjacent sides J J of the exterior rim, but it moves loosely within the latter; each rim I and J J K having its own appropriate set of spokes, C and D, entirely free and independent of each other; both sets, however, being fastened at their inner ends to the hub-plates B and B' alternately with each other; the spring-spokes D at right angles to the axis of the tubular hub A, from the rim to their screw-threaded inner ends and bushing E placed thereon; while the alternately dished or inclined spokes C slant inwardly from opposite sides, being fastened alternately or by turns in the circular disks or hub-plates B and B'. It follows from this construction and arrangement of the two rims I and J K J, with their respective sets of spokes, C and D, that the outer rim J K J, in which the running-tire L is seated, will possess a certain amount of "spring" or resiliency due to the spoke-springs G G', the tension of which may be adjusted by means of their movable bearings or bushings E. In this manner, and by virtue of this construction and combination of parts, I obtain all the advantages of a "pneumatic" or "cushion" tire in the concave seat K, without any of its disadvantages, as the "spring" of the tire is due to the springs G G' instead of to compressed air. "Leakage," therefore, is impossible; and the amount of "spring" or resiliency, which the tire is to have, may be regulated at will and in a few moments by adjusting the tension of the coiled springs G G', simply by adjustment of their flanged bearings E $e$ upon the spokes.

Having thus described my invention, I claim and desire to secure by Letters Patent of the United States—

1. In a wheel for bicycles and other vehicles, the combination of the hub A B B', spokes C, inner rim I, spokes D provided with the adjustable springs G G', and outer rim comprising the parallel sides or fellies J J and concave rim or tire-seat L; substantially as and for the purpose shown and set forth.

2. In a wheel for bicycles and other vehicles, the combination with the hub A B B', dished spokes C and inner rim I, of the independent rim J K J, spokes D, adjustable bushings or spring-bearings E $e$, arms F F', and springs G G'; substantially as and for the purpose shown and set forth.

3. In a wheel for bicycles and other vehicles, the combination with a common hub of two independent and disconnected rims, one of which forms an inner rim, connected to the hub by rigid spokes, while the other forms an exterior rim provided with a concave seat for a tire and connected to the hub by spokes provided with adjustable springs whereby the "spring" or resiliency of said outer rim in respect to the hub and the inner rim may be regulated by adjusting the tension of the springs upon their respective spokes; substantially in the manner and for the purpose herein shown and set forth.

In testimony that I claim the foregoing as my own I have hereunto affixed my signature in presence of two witnesses.

BENJAMIN J. BRAGDON.

Witnesses:
W. E. PAUL,
W. C. STEVENS.